US012497997B2

(12) United States Patent
Yasuda et al.

(10) Patent No.: US 12,497,997 B2
(45) Date of Patent: Dec. 16, 2025

(54) SLIDING MEMBER

(71) Applicant: DAIDO METAL CO., LTD., Nagoya (JP)

(72) Inventors: Erina Yasuda, Inuyama (JP); Yuma Haneda, Inuyama (JP)

(73) Assignee: DAIDO METAL CO., LTD., Nagoya (JP)

( * ) Notice: Subject to any disclaimer, the term of this patent is extended or adjusted under 35 U.S.C. 154(b) by 0 days.

(21) Appl. No.: 18/191,439

(22) Filed: Mar. 28, 2023

(65) Prior Publication Data

US 2023/0313836 A1    Oct. 5, 2023

(30) Foreign Application Priority Data

Mar. 31, 2022    (JP) .................................. 2022-059748

(51) Int. Cl.
*F16C 33/20*    (2006.01)

(52) U.S. Cl.
CPC .......... *F16C 33/201* (2013.01); *F16C 33/206* (2013.01); *F16C 2204/20* (2013.01); *F16C 2204/60* (2013.01); *F16C 2208/02* (2013.01); *F16C 2208/14* (2013.01); *F16C 2240/48* (2013.01); *F16C 2300/02* (2013.01)

(58) Field of Classification Search
CPC .. F16C 33/201; F16C 33/206; F16C 2204/20; F16C 2204/60; F16C 2208/02; F16C 2240/48; F16C 2300/02; F16C 2202/02; F16C 2202/60; F16C 2208/14; F16C 2208/30; F16C 33/124; F16C 33/208
See application file for complete search history.

(56) References Cited

U.S. PATENT DOCUMENTS

| | | |
|---|---|---|
| 6,183,137 B1 | 2/2001 | Kojima et al. |
| 9,029,302 B2 | 5/2015 | Kamiya et al. |
| 2005/0139064 A1 | 6/2005 | Hakamata et al. |
| 2009/0297859 A1* | 12/2009 | Ohkawa ................. C08L 79/08 524/80 |
| 2012/0270761 A1 | 10/2012 | Kamiya et al. |

FOREIGN PATENT DOCUMENTS

| | | | |
|---|---|---|---|
| DE | 199 46 193 A1 | 4/2000 | |
| DE | 60 2004 002 183 T2 | 7/2007 | |
| EP | 1849818 A1 | 10/2007 | |
| JP | 2003156045 A | 5/2003 | |
| KR | 1020070088442 A | 8/2007 | |
| WO | 2010/066396 A1 | 6/2010 | |
| WO | 2011111668 A1 | 9/2011 | |
| WO | WO-2012005325 A1 * | 1/2012 | ......... C23C 14/0605 |
| WO | WO-2019181132 A1 * | 9/2019 | ............ C22C 21/00 |

OTHER PUBLICATIONS

Wolkenhauer, et al., Standardabweichung [Standard Deviation]; https://roempp.thieme.de/lexicon/RD-19-03730, with English translation; 2011.

* cited by examiner

*Primary Examiner* — Taiwo Oladapo
(74) *Attorney, Agent, or Firm* — FISHERBROYLES, LLP; Roger L. Browdy

(57) ABSTRACT

A sliding member of the present invention includes a resin overlay layer containing an additive, in which the additive contains an oleophobic resin made of a fluorine resin and/or a silicon resin, and an appropriate amount of the oleophobic resin is uniformly dispersed on a sliding surface of the resin overlay layer. According to the sliding member, oil repellency can be imparted to the sliding surface of the resin overlay layer.

5 Claims, 1 Drawing Sheet

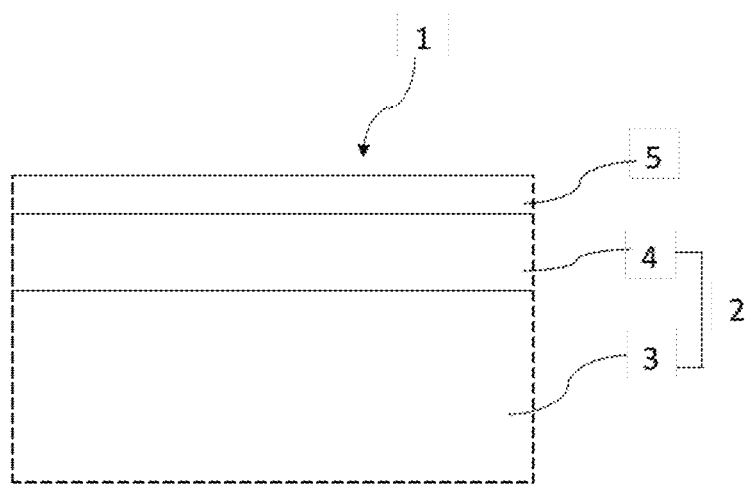

SLIDING MEMBER

BACKGROUND OF THE INVENTION

(1) Field of the Invention

The present invention relates to an improvement of a sliding member.

(2) Description of Related Art

The sliding member generally includes a base material layer and a surface layer, and a slid member is supported by the surface layer. The surface layer is formed of a soft metal material, and the surface thereof may be covered with a resin overlay layer.

The resin overlay layer is prepared by dispersing various additives in a binder resin. Representative examples of the additives include solid lubricants.

In order to reduce frictional resistance with the slid member, solid lubricants having cleavability are often employed as the solid lubricants described above.

WO 2011/111668 A and JP 2003-156045 A are shown as prior documents of the current invention.

SUMMARY OF THE INVENTION

With respect to the relationship of the friction coefficient between the resin overlay layer and the slid member, a cleavable solid lubricant exerts its action exclusively at the start of sliding. This is because the solid lubricant can be cleaved when the resin overlay layer and the slid member are in solid contact with each other. However, there has been a need for reduction in the friction coefficient during fluid lubrication, lately. At the time of fluid lubrication, a shaft and a bearing are completely separated from each other by lubricating oil, and cleavage of the solid lubricant hardly occurs.

Of course, there is no doubt that application of the cleavable solid lubricant reduces the friction coefficient of the resin overlay layer. However, it is necessary to select a lubricant from a new point of view in order to satisfy the recent demand for the sliding member.

An object of the present invention is to maintain a low friction coefficient between a resin overlay layer and a slid member during fluid lubrication.

The present inventors have conducted diligent research in order to achieve the object, and resultantly found that the sliding surface of the resin overlay layer may have oil repellency. When the oil repellency of the sliding surface is insufficient, the lubricating oil between the sliding surface and the slid member gets wet and spreads on the sliding surface and easily adheres thereto.

In other words, when a speed difference occurs between the sliding surface and the slid member, a force for shearing the lubricating oil film adhered to the sliding surface is needed.

On the other hand, in the case of the sliding surface having appropriate oil repellency, when a speed difference occurs between the sliding surface and the slid member, the lubricating oil does not adhere to the sliding surface but moves like sliding on the sliding surface. It is considered that the force required to separate the lubricating oil from the sliding surface in this case is smaller than the force required to shear the lubricating oil film. Therefore, the friction coefficient between the sliding surface and the slid member decreases.

Based on such findings, the present inventors have repeatedly studied oil repellency to be imparted to the sliding surface of the resin overlay layer, and have consequently conceived one aspect of the present invention.

Hence, a sliding member includes a resin overlay layer containing an additive,
in which the additive contains an oleophobic resin made of a fluorine resin and/or a silicon resin, and the oleophobic resin is uniformly dispersed on a sliding surface of the resin overlay layer under the following conditions:

$$U = s/(S*0.2) \leq 1 \tag{1}$$

where $6\% \leq S \leq 30\%$ holds,
s is a standard deviation of areas of Voronoi polygons, and
S is an area ratio of an area where the oleophobic resin is exposed.

According to the sliding member in which the dispersion of the oleophobic resin on the sliding surface of the resin overlay layer satisfies Formula (1) above, an appropriate amount of the oleophobic resin is appropriately dispersed on the sliding surface, and a region lacking of the oleophobic resin is reduced. Thus, the entire sliding surface has appropriate oil repellency. Accordingly, it is possible to maintain a suitable friction coefficient over the whole sliding surface.

The amount of the oleophobic resin to be added is defined by the area ratio S. Thus, the area ratio of an area where the oleophobic resin added to the resin overlay layer is exposed on the surface is set to 6% or more, thereby ensuring sufficient oil repellency on the sliding surface of the resin overlay layer. Further, the area ratio is set to 30% or less, thereby preventing the oil repellency of the sliding surface of the resin overlay layer from being excessive.

A surface or cross section of the oleophobic resin is photographed. The resulting image is processed to calculate the exposed area of the oleophobic resin and other areas, and the area ratio S is obtained.

The dispersibility of the oleophobic resin is defined by a standard deviation s of areas of Voronoi polygons. The smaller the standard deviation s is, the more uniform the areas of Voronoi polygons are. In other words, it means that the oleophobic resin is more uniformly dispersed.

Here, the areas of Voronoi polygons are obtained as described below. The surface of the overlay layer is photographed. The resulting image is processed, and the centers of the exposed oleophobic resin are connected by a straight line. Perpendicular bisectors of respective sides of the triangle formed described above are connected and the first connected straight line is erased to form a polygon, i.e., a Voronoi polygon. An area of the polygon can be obtained by image processing using general-purpose imaging software.

The standard deviation s is obtained from the distribution of the areas of all the Voronoi polygons included in a predetermined region of a captured image.

Adjustment of the amount of the oleophobic resin to be added to the resin overlay layer makes it easy to ensure values desired for the area of the exposed oleophobic resin and the standard deviation s. Thus, the standard deviation s and the area ratio S are associated as in Formula (1). U in Formula (1) is an index indicating the balance between the amount of the oleophobic resin to be added and the dispersibility of the oleophobic resin.

Suitable oil repellency of the resin overlay layer of the sliding member can also be defined as follows. Specifically, when 10 µL of an oil droplet is dropped on the resin overlay layer, a diameter of the spread oil droplet 2 seconds after the dropping of the droplet is 10.0 mm or less.

Here, a method for evaluating oil repellency by dropping a predetermined oil droplet onto the resin overlay layer and using the spread oil droplet after a predetermined time as an index is referred to as "dropping test".

The diameter of the spread oil droplet refers to a diameter of a circle having an area equal to the area obtained by observing the area of the droplet 2 seconds after the dropping of the droplet from the vertically upper side of the droplet dropping surface. Note that a lubricating oil corresponding to 0 W-8 is used for oil droplets, and the ambient temperature at the time of measurement is set to a range of 20 to 30° C.

The amount of oil droplet (10 μL) and the elapsed time (2 seconds) employed as described above are indices when the resin overlay layer is flat or has a curved surface with a radius of curvature of 40 mm or more on the assumption of a sliding member that is used industrially and widely.

As the radius of curvature is decreased, the amount of oil droplet to be dropped is preferably reduced so that the height from the apex of the oil droplet to the sliding surface is the same as the above index. In response to this adjustment, the diameter of the spread droplet to be measured is also adjusted.

The particle size of the oleophobic resin is preferably 1 μm or less, and the aspect ratio of the oleophobic resin is preferably from 1.0 to 1.4.

The particle size of the oleophobic resin is set to 1 μm or less and the aspect ratio of the oleophobic resin is set to a range of 1.0 to 1.4, thereby ensuring the smoothness of the sliding surface of the resin overlay layer. The Wenzel equation shows that when the contact angle of the sliding surface is less than 90 degrees, roughening of the sliding surface allows the surface to be easily wetted by the lubricating oil. Therefore, when the oleophobic resin is made fine and shaped like a spherical shape as described above, the smoothness of the sliding surface where the oleophobic resin is exposed is ensured, and the oil repellency of the sliding surface is not inhibited.

Here, the particle size and the aspect ratio are defined as below. An image obtained by photomicrography of the cross section of the resin overlay layer is processed, a region corresponding to particles of the oleophobic resin is approximated by a circle and an ellipse, and an equivalent circle diameter is used as the particle size. The major axis/minor axis of the approximated ellipse is defined as the aspect ratio.

The amount of the additive to be added to the resin overlay layer is preferably 30 vol % or more.

Here, the amount of the additive to be added can be defined by the volume ratio of the raw materials at the time of producing the resin overlay layer. As described above, the area ratio of the additive to the resin overlay layer in the cross-sectional image of the resin overlay layer can also be the amount of the additive to be added.

The amount of the oleophobic resin in the additive contained in the resin overlay layer is preferably 20 vol % or more. In other words, an area ratio S of an area in which the oleophobic resin is exposed is preferably 6% or more. This makes it possible to ensure oil repellency suitable for the sliding surface of the resin overlay layer. Accordingly, the friction coefficient of the resin overlay layer in the fluid lubrication state is reduced.

Here, the amount of the oleophobic resin in the additive can be defined by the volume ratio of the raw materials at the time of producing the resin overlay layer. As described above, the ratio of the area of the oleophobic resin to the area of the additive appearing in the cross-sectional image of the resin overlay layer can also be the amount of the oleophobic resin.

In this regard, the area ratio S is set to 30% or less, and this makes it possible to prevent oil repellency of the sliding surface from being excessive. Excessive oil repellency of the sliding surface may adversely affect the formation of a lubricating oil film between the sliding surface and the slid surface.

A ratio Rp/Rv of a maximum peak height Rp to a maximum valley depth Rv on the surface of the resin overlay layer is preferably set to a range of 0.7 to 1.8.

More preferably, the ratio Rp/Rv is set to a range of 0.8 to 1.6. The ratio Rp/Rv is set to a range of 0.8 to 1.6, as a result of which smoothness on the surface of the resin overlay layer is ensured, and thus the oil repellency is improved. Accordingly, the friction coefficient of the resin overlay layer in the fluid lubrication state is reduced.

BRIEF DESCRIPTION OF THE DRAWINGS

FIG. 1 is a cross-sectional view showing a configuration of a sliding member according to an embodiment of the present invention.

DETAILED DESCRIPTION OF PREFERRED EMBODIMENTS

Hereinafter, the present invention will be described in more detail based on embodiments.

A base material layer 2 constituting a sliding member 1 is generally made of a metal material.

In the bearing as an example of the sliding member, the base material layer 2 has a configuration in which an aluminum-based bearing alloy layer 4 is laminated on a back metal layer 3 made of a steel material.

A resin overlay layer 5 is laminated on the base material layer 2.

The resin overlay layer 5 is made of a composition prepared by adding various additives to a binder resin.

The binder resin can be appropriately selected depending on the intended use of the sliding member 1. For example, one or more of a polyimide resin, a polyamide imide resin, an epoxy resin, a phenol resin, a polyamide resin, and an elastomer can be employed, and a polymer alloy may be used.

An oleophobic resin can be used as the additive.

The material of the oleophobic resin can be appropriately selected depending on the intended use of the sliding member 1.

In the present invention, attention is paid to an oleophobic resin made of a fluorine resin and an oleophobic resin made of a silicon resin.

Examples of the oleophobic resin made of a fluorine resin include PTFE, PFA, FEP, ETFE, and PVDF.

Examples of the oleophobic resin made of a silicon resin include silicone powder and silicone rubber powder.

It is preferable that an appropriate amount of these oleophobic resins is uniformly dispersed on the sliding surface of the resin overlay layer. It is more preferable that the oleophobic resins are also uniformly dispersed in the thickness direction.

In the present invention, the dispersion of the oleophobic resin on the sliding surface of the resin overlay layer is defined as follows:

$$U = s/(S*0.2) \leq 1 \qquad (1)$$

where $6\% \leq S \leq 30\%$ holds,
s is a standard deviation of areas of Voronoi polygons, and
S is an area ratio of an area where the oleophobic resin is exposed.

In order to uniformly disperse the oleophobic resins on the resin overlay layer, the particle size of the oleophobic resins, the selection of the binder resin, the stirring method, and the like are appropriately adjusted.

The ratio of the fluorine resin and the silicon resin is not particularly limited. The fluorine resin may be used singly, the silicon resin may be used singly, or a mixture of the fluorine resin and the silicon resin may be used.

A particle size of the oleophobic resin is 1.0 μm or less and an aspect ratio of the oleophobic resin is from 1.0 to 1.4. The particle size is more preferably 0.8 μm or less, and the aspect ratio is more preferably from 1.0 to 1.1. The lower limit of the particle size is not particularly limited, and the lower limit of the particle size of an industrially available oleophobic resin is considered to be 0.2 μm.

The method for measuring the particle size and the aspect ratio is as described above.

In addition to the oleophobic resins described above, a versatile solid lubricant, hard particles, or the like can be used as the additive.

Examples of the solid lubricant include molybdenum disulfide, tungsten disulfide, h-BN (h-boron nitride), graphite, melamine cyanurate, carbon fluoride, phthalocyanine, graphene nanoplatelets, fullerene, ultra-high molecular weight polyethylene (trade name "MIPELON", manufactured by Mitsui Chemicals, Inc.), and Nε-Lauroyl-L-lysine (AMIHOPE (trade name), manufactured by Ajinomoto Co., Inc.).

Examples of the hard particles include metal particles, metal oxide particles, metal nitride particles, and carbides. Addition of the hard particles enables the wear resistance of the resin overlay layer to be maintained.

Moreover, a pigment can be added as the additive.

The lower limit of the amount of the additive to be added is not particularly limited, and the amount of the additive to be added to the resin overlay layer is preferably 30 vol % or more. The amount of the additive to be added is more preferably 40 vol % or more. The upper limit of the amount of the additive to be added is not particularly limited, and can be set to 60 vol % from the viewpoint of ensuring other characteristics (wear resistance and the like) of the resin overlay layer.

The method for specifying the amount of the additive to be added is as described above.

In all the additives added to the resin overlay layer, the lower limit of the amount of the oleophobic resin is not particularly limited, and this amount is preferably 20% or more. The amount of the oleophobic resin is more preferably 30% or more. The upper limit of the amount of the oleophobic resin is not particularly limited, and can be set to 50% from the viewpoint of ensuring other characteristics (seizure resistance and the like) of the resin overlay layer. The upper limit of the amount of the oleophobic resin is more preferably 40%.

The method for specifying this amount is as described above.

The additive is selected such that the ratio Rp/Rv of the maximum peak height Rp to the maximum valley depth Rv on the sliding surface of the resin overlay layer is from 0.7 to 1.8. The ratio Rp/Rv is more preferably in a range of 0.8 to 1.6.

Here, the Rp and Rv are based on the standard of JIS B 0601.

The resin overlay layer 5 is formed as described below.

In order to dissolve a resin material used for the binder resin, a specific solvent such as NMP (N-methyl-2-pyrrolidone), isophorone, GBL (γ-butyrolactone), DMSO (dimethylsulfoxide), or DAM (dimethylacetamide) is used. Such a solvent generally has a high boiling point (boiling point: higher than 150° C.) and is expensive. It is necessary to cause a solid lubricant to be dispersed in the solvent. Thus, the binder resin is dissolved in a first solvent such as NMP, and then a second solvent is added to the mixture to adjust the viscosity of the binder resin, resulting in a state in which dispersion is facilitated. Various additives including an oleophobic resin are sequentially added to the mixture and stirred. As the second solvent, a solvent having a boiling point (boiling point: 150° C. or lower) lower than that of the first solvent, such as ethanol, butyl acetate, cyclohexane, methyl ethyl ketone, MIBK (methyl isobutyl ketone), toluene, xylene, or ethylbenzene, can be employed.

The surface of the bearing alloy layer 4 is coated with the liquid composition thus prepared, dried to volatilize the solvent, and then thermally cured. As the coating method, a known method such as a spray coating method, a roll coating method, a padding method, or a screen printing method can be employed.

Examples

Hereinafter, Examples of the present invention will be described.

The sliding member 1 in each of the Examples was formed to have, for example, a cross-sectional structure shown in FIG. 1. More specifically, the aluminum-based bearing alloy layer 4 was lined on the back metal layer 3 made of steel to produce a bimetal, and the bimetal was shaped into a semi-cylindrical shape. Thereafter, the surface of the bearing alloy layer 4 was subjected to boring processing for surface finishing. As a result, the base material layer 2 (thickness: 1.5 mm) was formed. Next, the surface of the semi-cylindrical molded product was washed (washed to give a roughened surface).

The resin overlay layer 5 (3 to 10 μm) containing an oleophobic resin was laminated on the upper surface of the base material layer 2 thus formed. The lamination conditions are as follows.

(1) Mixing method

Solvent 1: NMP

Solvent 2: Xylene (2) Coating method: coating by spraying at preheating temperature (80 to 100° C.)

(3) Drying conditions: drying in a furnace (at 140 to 180° C.) for about 5 minutes The resultant sliding members of the Examples and Comparative Examples were subjected to a friction test in a room temperature environment under the following conditions.

| Item | Conditions | Unit |
| --- | --- | --- |
| Bearing dimension | Φ56 × L15 × t1.5 | mm |
| Rotation speed | 2000 | rpm |
| Load | 5 | Kgf |
| Lubricating oil | VG22 | — |
| Shaft material | S55C | — |
| Time | 1 | Time |

The area ratio S and the standard deviation s were calculated by performing image processing on the cross section of the resin overlay layer.

An electron microanalyzer JXA-8530F was used as a photographing device.

Standard image processing software (WinROOF2021) was used to calculate the areas of the oleophobic resin and the like and to specify the areas of Voronoi polygons and the standard deviation s.

The compositions and measurement results of Examples 1 to 3 and Comparative Examples 1 to 6 are shown in Table 1.

TABLE 1

| | Measured value | | | Composition | | | | | Volume ratio | |
|---|---|---|---|---|---|---|---|---|---|---|
| | | | | (1) | (2) | (2) Silicone | (3) | (3) | (2) + (3)/ | (2)/ |
| | S | U | Friction | PAI | PTFE | resin | MoS$_2$ | Gr | (1) + (2) + (3) | (2) + (3) |
| Example 1 | 29.6 | 0.86 | 0.09 | 55 | 30 | | 15 | | 45% | 67% |
| Example 2 | 16.1 | 0.9 | 0.1 | 64 | 16 | | 20 | | 36% | 44% |
| Example 3 | 8.2 | 0.79 | 0.11 | 69 | 7 | | 24 | | 31% | 23% |
| Example 4 | 6.7 | 0.83 | 0.11 | 70 | | 6 | | 24 | 30% | 20% |
| Comparative Example 1 | 5.2 | 0.96 | 0.26 | 65 | 5 | | 30 | | 35% | 14% |
| Comparative Example 2 | 32.4 | 1.00 | 0.23 | 62 | 33 | | 5 | | 38% | 87% |
| Comparative Example 3 | 4.5 | 1.90 | 0.38 | 56 | 4 | | 40 | | 44% | 9% |
| Comparative Example 4 | 40.3 | 1.24 | 0.32 | 57 | 40 | | 3 | | 43% | 93% |
| Comparative Example 5 | 13.7 | 1.06 | 0.16 | 71 | 14 | | 15 | | 29% | 48% |
| Comparative Example 6 | 25.9 | 1.12 | 0.18 | 64 | 26 | | 10 | | 36% | 72% |

A product, manufactured by Solvay S.A., was used as PAI (polyamide imide) in each of the Examples and Comparative Examples. A product, manufactured by Chemours-Mitsui Fluoroproducts Co., Ltd., was used as PTFE (polytetrafluoroethylene) in each of the Examples and Comparative Examples. The particle size of the oleophobic resin was 1 µm or less. The aspect ratio of the oleophobic resin was from 1.0 to 1.4. A product, manufactured by Shin-Etsu Chemical Co., Ltd., was used as the silicone resin of Example 4. The particle size of the oleophobic resin was 1 µm or less. The aspect ratio of the oleophobic resin was from 1.0 to 1.4.

From the friction values in the Examples and Comparative Examples in Table 1, it is found that the value of U defined by Formula (1) is preferably less than 1.

Here, it is found that the amount of the additives ((2)+(3)/(1)+(2)+(3)) in the total composition is preferably 30 vol % or more.

Further, it is found that the amount ((2)/(2)+(3)) of the oleophobic resin (PTFE or silicone resin) in the additives is preferably 20 vol % or more.

Next, Table 2 shows a relationship between the roughness of the sliding surface of the resin overlay layer and the friction value under the condition of U<1 in Formula (1).

In Table 2, the particle size of the oleophobic resin (PTEF) was 1 µm or less. The aspect ratio of the oleophobic resin was from 1.0 to 1.4.

The results of Table 2 show that a ratio Rp/Rv of a maximum peak height Rp to a maximum valley depth Rv on the sliding surface of the resin overlay layer is preferably set to a range of 0.7 to 1.8. The ratio Rp/Rv is more preferably in a range of 0.8 to 1.6.

Here, the Rp and Rv are based on the standard of JIS B 0601. The surface was measured using Surfcorder SE3500.

The surface roughness was adjusted by blasting.

The sliding surface of the resin overlay layer was subjected to a dropping test in the following manner.

In a room temperature environment, a microsyringe is used to drop 10 µL of oil (specific name: HONDA ULTRA NEXT) while a needle of the microsyringe is brought into contact with, or slightly spaced apart from, a sliding surface of a resin overlay layer of each sliding member left to stand. The state of the sliding surface 2 seconds after the dropping of the droplet is photographed from vertically above while the state of the sliding member left to stand is maintained. The resulting image is processed to obtain the area of the oil. The diameter (spread value) of a circle having the same area as the obtained area is calculated.

A microscope VHX-6000 was used to capture the image. Standard image processing software (microscope VHX-6000) was used for area calculation through image processing.

TABLE 2

| | Measured value | | | | Composition | | | Volume ratio | |
|---|---|---|---|---|---|---|---|---|---|
| | | | | | (1) | (2) | (3) | (2) + (3)/ | (2)/ |
| | S | U | Rp/Rv | Friction | PAI | PTFE | MoS$_2$ | (1) + (2) + (3) | (2) + (3) |
| Example 5 | 16.1 | 0.90 | 1.8 | 0.10 | 64 | 16 | 20 | 36% | 44% |
| Example 6 | 15.9 | 0.88 | 1.6 | 0.09 | 64 | 16 | 20 | 36% | 44% |
| Example 7 | 16.0 | 0.89 | 0.8 | 0.08 | 64 | 16 | 20 | 36% | 44% |
| Example 8 | 16.3 | 0.91 | 0.7 | 0.10 | 64 | 16 | 20 | 36% | 44% |

The results of the dropping test for Examples and Comparative Examples are shown in Table 3.

TABLE 3

|  | Measured value | | Composition | | | Volume ratio | |
| --- | --- | --- | --- | --- | --- | --- | --- |
|  | Spread diameter | Friction | (1) PAI | (2) PTFE | (3) MoS$_2$ | (2) + (3)/ (1) + (2) + (3) | (2)/ (2) + (3) |
| Example 9 | 10.0 | 0.11 | 60 | 10 | 30 | 40% | 25% |
| Example 10 | 9.0 | 0.10 | 60 | 20 | 20 | 40% | 50% |
| Example 11 | 8.6 | 0.09 | 60 | 30 | 10 | 40% | 75% |
| Comparative Example 7 | 12.0 | 0.40 | 60 | 0 | 40 | 40% | 0% |

The results of Table 3 show that the diameter of the spread oil droplet is preferably 10.0 mm or less.

The present invention is not limited to the above description of the embodiments of the invention. Various modified embodiments are also included in the present invention as long as they are easily conceivable by those skilled in the art and do not depart from the scope of claims. A device using a bearing mechanism, such as an internal combustion engine, using the sliding member of the present invention exhibits excellent sliding characteristics.

What is claimed is:

1. A sliding member comprising a resin overlay layer containing an additive,
wherein the additive contains an oleophobic resin made of a fluorine resin and/or a silicon resin, and
the oleophobic resin is uniformly dispersed on a sliding surface of the resin overlay layer under the following conditions:

$$U = s/(S*0.2) \leq 1 \quad (1)$$

where $6\% \leq S \leq 30\%$,
s is a standard deviation of areas of Voronoi polygons on a portion of a surface of the overlay layer, wherein the Voronoi polygons are based on the centers of the exposed oleophobic resin, and
S is an area ratio calculated as the portion of an area occupied by the resin to the total area of an area of the overlay layer where the oleophobic resin is exposed.

2. The sliding member according to claim 1, wherein the oleophobic resin has a particle size of 1.0 μm or less and an aspect ratio of 1.0 to 1.4.

3. The sliding member according to claim 1, wherein an amount of the additive to be added in the resin overlay layer is 30 vol % or more.

4. The sliding member according to claim 3, wherein an amount of the oleophobic resin in the additive contained in the resin overlay layer is 20 vol % or more.

5. The sliding member according to claim 1, wherein a ratio Rp/Rv of a maximum peak height Rp to a maximum valley depth Rv on the sliding surface of the resin overlay layer is from 0.7 to 1.8.

* * * * *